(12) United States Patent
Fu et al.

(10) Patent No.: US 12,190,597 B2
(45) Date of Patent: Jan. 7, 2025

(54) METHOD AND DEVICE FOR PROCESSING A 3D POINT CLOUD REPRESENTING SURROUNDINGS

(71) Applicant: Robert Bosch GmbH, Stuttgart (DE)

(72) Inventors: Chengxuan Fu, Ditzingen (DE); Jasmine Richter, Ludwigsburg (DE); Dennis Hardenacke, Kornwestheim (DE); Ricardo Martins Costa, Esposende (PT)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 17/744,090

(22) Filed: May 13, 2022

(65) Prior Publication Data

US 2022/0375229 A1 Nov. 24, 2022

(30) Foreign Application Priority Data

May 18, 2021 (DE) ...................... 10 2021 204 985.0

(51) Int. Cl.
*G06K 9/00* (2022.01)
*G01C 7/02* (2006.01)
(Continued)

(52) U.S. Cl.
CPC ............... *G06V 20/56* (2022.01); *G01C 7/02* (2013.01); *G01C 21/3819* (2020.08);
(Continued)

(58) Field of Classification Search
CPC ..... G06T 7/00; G06T 7/11; G06T 7/40; G06T 7/50; G06T 7/60; G06T 7/62; G06T 7/64;
(Continued)

(56) References Cited

U.S. PATENT DOCUMENTS 9,396,545 B2 * 7/2016 Fu .................... G06V 20/176
9,846,946 B2 * 12/2017 Fan .................... G06V 20/56
(Continued)

FOREIGN PATENT DOCUMENTS

DE 102011100927 B4 8/2014
DE 102015010514 B4 6/2019

*Primary Examiner* — Eric Rush
(74) *Attorney, Agent, or Firm* — NORTON ROSE FULBRIGHT US LLP; Gerard A. Messina

(57) ABSTRACT

A method and to a device for processing a 3D point cloud representing surroundings, which is generated by a sensor. Initially, starting cells are identified based on ascertained starting ground points within the 3D point cloud which meet at least one predefined ground point criterion with respect to a reference plane divided into cells. Thereafter, cell planes are ascertained for the respective starting cells of the reference plane. Thereafter, estimated cell planes and ground points are ascertained for candidate cells deviating from the starting cells based on the cell planes of the starting cells, which are subsequently converted into final cell planes. As a result of such a cell growth originating from the starting cells, the cells of the reference plane are iteratively run through and processed so that the 3D point cloud is reliably classifiable into ground points and object points based on this method.

12 Claims, 2 Drawing Sheets

(51) Int. Cl.
    *G01C 21/00* (2006.01)
    *G01S 17/89* (2020.01)
    *G06T 7/11* (2017.01)
    *G06T 7/50* (2017.01)
    *G06T 17/00* (2006.01)
    *G06T 17/30* (2006.01)
    *G06V 20/56* (2022.01)

(52) U.S. Cl.
    CPC .......... *G01C 21/3822* (2020.08); *G01S 17/89* (2013.01); *G06T 7/11* (2017.01); *G06T 7/50* (2017.01); *G06T 17/00* (2013.01); *G06T 17/30* (2013.01); *G06V 20/588* (2022.01); *G06T 2200/04* (2013.01); *G06T 2200/08* (2013.01); *G06T 2207/10028* (2013.01); *G06T 2207/20021* (2013.01); *G06T 2207/30252* (2013.01)

(58) Field of Classification Search
    CPC .. G06T 7/70; G06T 7/74; G06T 17/00; G06T 17/10; G06T 17/20; G06T 17/30; G06T 2200/04; G06T 2200/08; G06T 2207/10028; G06T 2207/20021; G06T 2207/20068; G06T 2207/30181; G06T 2207/30236; G06T 2207/30248; G06T 2207/30252; G06V 10/20; G06V 10/26; G06V 10/28; G06V 10/44; G06V 10/46; G06V 10/469; G06V 10/471; G06V 10/476; G06V 20/10; G06V 20/182; G06V 20/54; G06V 20/56; G06V 20/58; G06V 20/586; G06V 20/588; G06V 20/64; G01S 7/295; G01S 7/2955; G01S 7/41; G01S 7/414; G01S 7/4802; G01S 7/4808; G01S 13/04; G01S 13/06; G01S 13/42; G01S 13/89; G01S 13/91; G01S 13/93; G01S 13/931; G01S 17/04; G01S 17/06; G01S 17/42; G01S 17/86; G01S 17/89; G01S 17/894; G01S 17/93; G01S 17/931; G01C 7/02; G01C 15/00; G01C 15/002; G01C 15/004; G01C 21/005; G01C 21/30; G01C 21/32; G01C 21/3804; G01C 21/3815; G01C 21/3819; G01C 21/3822; G01C 21/3826; G01C 21/383; G01C 21/3863; G01C 21/3867
    USPC ....... 382/100, 103, 104, 106, 113, 153, 154, 382/159, 173, 174, 180, 190, 192, 195, 382/201, 203, 205, 224–226, 228, 241, 382/276, 282, 307, 312, 325; 701/23, 28, 701/300, 301; 356/2, 3, 4.01; 348/113, 348/118, 119, 148
    See application file for complete search history.

(56) References Cited

U.S. PATENT DOCUMENTS

| | | | |
|---|---|---|---|
| 10,049,492 B2* | 8/2018 | Babahajiani | G06T 17/20 |
| 2024/0027622 A1* | 1/2024 | Ferroni | G01S 17/42 |

* cited by examiner

METHOD AND DEVICE FOR PROCESSING A 3D POINT CLOUD REPRESENTING SURROUNDINGS

FIELD

The present invention relates to a method and a device for processing a 3D point cloud representing surroundings.

BACKGROUND INFORMATION

Sensors, for example LIDAR sensors or radar sensors, which are used in connection with vehicles to carry out an automatic detection of surroundings are described in the related art. Such a surroundings detection is used, for example, by systems for an autonomous or semi-autonomous driving operation of such vehicles. Pieces of surroundings information generated by these sensors are frequently present in the form of 3D point clouds, which may subsequently be evaluated by surroundings recognition systems. A processing step which is important in this connection is directed at a differentiation of points within the 3D point cloud which are to be assigned to a ground surface and which are to be assigned to objects in the surroundings.

German Patent Application No. DE 10 2011 100 927 B4 describes a method and a system for detecting and tracking objects in the vicinity of a vehicle, the method encompassing that multiple scan points are provided by a laser distance measuring system, the scan points and vehicle dynamics data being used to establish a location of a ground plane. An algorithm first estimates the location of a ground plane on the basis of a previous ground plane location, based on data of chassis dynamics sensors and an eigenvector calculation applied to the point cloud data.

German Patent Application No. DE 10 2015 010 514 B4 describes a method for ascertaining pieces of map information for a map data set of navigation surroundings, at least a portion of the navigation surroundings being measured by recording a 3D measuring data set, in particular, of a 3D point cloud, with the aid of a three-dimensional measuring device. Additionally, it is provided to project the points of the 3D point cloud onto a two-dimensional grid in the ground plane. Thereafter, it is evaluated how many points fall into each cell of the grid, i.e., each grid element, so that a histogram data set is created, based on which vertical structures may be recognized and classified.

SUMMARY

According to a first aspect of the present invention, a method for processing a 3D point cloud representing surroundings is provided.

In accordance with an example embodiment, in a first step of the method according to the present invention, a 3D point cloud is received, which was ascertained based on a sensor, in particular, a surroundings sensor of a vehicle. The sensor is preferably an active sensor, such as a LIDAR sensor, a radar sensor, an ultrasonic sensor, or a sensor differing therefrom. It is possible that the points of the 3D point cloud are present at fixed grid positions and/or arbitrary positions within the 3D point cloud.

In a second step of the method according to the present invention, starting ground points within the 3D point cloud are ascertained, those points of the 3D point cloud being classified as starting ground points which are situated within a first predefined distance from the sensor and meet at least one predefined ground point criterion with respect to a reference plane, the reference plane being a plane which is predefined with respect to the sensor and, in particular, being a plane which represents a ground surface. In the case of a use of the method according to the present invention in connection with a surroundings detection of a vehicle, the reference plane preferably represents a roadway surface in the immediate surroundings of the sensor. The first predefined distance is, for example, the shortest distance between a respective point and the sensor (i.e., between a respective point and a reference position of the sensor, which is situated, e.g., in the area of an inlet/outlet opening of the sensor) or a shortest distance between a normal vector of the reference plane which extends through the respective point and a normal vector of the reference plane which extends through the reference position of the sensor. The first predefined distance corresponds, for example, to a value in the range of 10 m to 30 m or a value differing therefrom. The first predefined distance is preferably selected in such a way that it is ensured that potential curvatures of the ground surface or of the roadway surface within this distance only have minor deviations from the reference plane, so that possibly present ground points within the 3D point cloud are identifiable as such with high reliability. Accordingly, it may be useful to select the predefined first distance in each case as a function of instantaneous surroundings (e.g., hilly or flat) from a plurality of predefined first distances. With the aid of the predefined ground point criterion, it is ensured that a point meeting this criterion is highly likely a point of the 3D point cloud which represents a ground point in the surroundings of the sensor.

In a third step of the method according to the present invention, at least one subarea of the reference plane is divided into a plurality of cells. Preferably, at least that area of the reference plane is divided into cells in which points of the 3D point cloud are present in a perpendicular projection of the 3D point cloud onto the reference plane. Moreover, in this step, points of the 3D point cloud are ascertained which correspond to each of the cells, points corresponding to a respective cell being those points which in the perpendicular projection onto the reference plane are enclosed by the respective cell.

In a fourth step of the method according to the present invention, those cells which include a first predefined minimum number of corresponding starting ground points, in particular, at least three starting ground points, are established as starting cells.

In a fifth step of the method according to the present invention, a cell plane is ascertained for each starting cell, the cell plane being ascertained in such a way that it approximates the position of the starting ground points of the respective starting cell according to a predefined calculation rule. For example, a regression analysis method is employed as the calculation rule, it also being possible to use methods differing therefrom, which cause the plane to approximate the position of the respective starting ground points as closely as possible.

In a sixth step of the method according to the present invention, candidate cells are ascertained within the reference plane, a candidate cell being a cell for which no cell plane has been ascertained yet which abuts at least one further cell (i.e., a starting cell or a candidate cell), for which a cell plane has already been ascertained, and which includes a second predefined minimum number of corresponding points of the 3D point cloud. The minimum number of corresponding points preferably corresponds to a value of one or a higher value. Additionally, however, it is also possible that the minimum number corresponds to a value of zero.

In a seventh step of the method according to the present invention, an estimated cell plane is calculated for each candidate cell from all cell planes (e.g., an average plane), which are present in cells which directly abut the respective candidate cell (i.e., a starting cell or a candidate cell).

In an eighth step of the method according to the present invention, cell plane candidate points are ascertained for each candidate cell, preferably at least those points of the 3D point cloud being taken into consideration which were not yet previously classified, and a point of the 3D point cloud then being ascertained as a cell plane candidate point when it corresponds to the instantaneously considered candidate cell and its smallest distance from the estimated cell plane of the candidate cell and/or from the reference plane does not exceed a second predefined distance.

In a ninth step of the method according to the present invention, a cell plane is ascertained for each candidate cell, the cell plane being ascertained in such a way that it approximates the position of the cell plane candidate points of the respective candidate cell according to the predefined calculation rule (see above).

In summary, the ascertained starting cells may, generally speaking, be considered as nuclei, from which a cell growth originates thereafter by ascertaining and processing candidate cells over the area of the reference plane to be considered.

It shall be pointed out that all steps which relate to respective candidate cells are preferably repeated until all cells of the reference plane which are to be taken into consideration have been processed. In this way, it is achieved that, proceeding from the starting cells, surroundings of the sensor represented by the 3D point cloud are iteratively processed with respect to existing ground points. The cell planes ascertained therefrom for all cells of the reference plane to be taken into consideration subsequently, as a whole, map a ground profile in the surroundings of the sensor. Moreover, the method is particularly suitable for mapping different ground profiles, in particular, uphill grades and downhill grades situated ahead, with high accuracy and reliability.

Another advantage of the method according to the present invention is that it may be carried out by computers having limited performance resources, and thus, for example, also by embedded systems, for example, due to relatively low requirements with regard to a computing power.

In accordance with an example embodiment of the present invention, for the adaptation to a respectively existing computing power and/or to an existing memory volume, it is possible to initially carry out individual steps of the method according to the present invention for all cells to be taken into consideration before a subsequent step is started. As an alternative, it is also possible to initially carry out individual steps only for one cell, and for cells possibly abutting this cell.

In addition, it shall be pointed out that all points which were not classified as ground points by the method according to the present invention may be considered object points. Moreover, it is also possible to consider points which meet neither a prerequisite for the classification as ground points nor as object points to be non-classified points (which are generated, e.g., by measuring noise, etc.), and to preferably not take them into consideration in a downstream processing. As a result of the deliberate division into ground points and object points, it is accordingly possible to carry out a downstream processing of the 3D point cloud, for example for recognizing objects in the surroundings of the sensor, with higher reliability since ground points are not erroneously interpreted as object points, or vice versa.

Preferred refinements of the present invention are disclosed herein.

In one advantageous example embodiment of the present invention, the cells which divide the reference plane abut one another without interruption and/or the cells which divide the reference plane are configured as polygonal, in particular, as triangular or as quadrangular cells. As an alternative or in addition, a shape and/or an extension of the respective cells is/are adapted as a function of a maximum resolution of the sensor and/or existing boundary conditions. For example, weather influences may be such boundary conditions, which, possibly in the case of existing precipitation, cause a greater noise component to be present within the 3D point cloud. In such a case, it may be advantageous to increase an extension of the respective cells, at the expense of the local resolution, in order to minimize an influence of this noise component on the ascertainment of the cell planes and/or the ground points. Moreover, it is also possible to vary respective extensions of the cells and/or respectively used cell shapes within the same 3D point cloud, for example to be able to process certain areas of the 3D point cloud with varying accuracy or efficiency as a function of the surroundings.

In one further advantageous example embodiment of the present invention, the at least one predefined ground point criterion is met when a shortest distance between respective points of the 3D point cloud and the reference plane does not exceed a third predefined distance (which, for example, corresponds to the second predefined distance or a value differing therefrom) and/or all vector products which result from possible combinations of vectors between a respective point of the 3D point cloud to be considered and at least two points directly adjoining this point have a maximum permissible first angular deviation with respect to a normal of the reference plane and/or an average vector, ascertained from the vector products for each considered point, has a maximum permissible second angular deviation from the normal of the reference plane. It shall be pointed out that one or multiple of the preceding ground point criteria is/are also usable for a plausibility check of finally ascertained ground points in the respective candidate cells.

Further advantageously, those points of the 3D point cloud are classified as object points which are situated within the first predefined distance from the sensor, whose smallest distance from the reference plane or from the estimated cell plane or from the cell plane exceeds a predefined object minimum distance, and whose vector products with directly adjoining points exceed a third predefined angular deviation with respect to the respectively used reference plane. In this way, it is possible to identify obvious object points with high reliability, and to exclude these, for example, from a downstream processing for the classification of points of the 3D point cloud into ground points and object points, so that a required computer power is able to be reduced.

Preferably, a subset or all points of the 3D point cloud, regardless of a prior classification as ground points, is/are classified as object points when their closest adjoining point was classified as an object point, a shortest distance from this closest adjoining point does not exceed a fourth predefined distance, and a distance between the two points with respect to the reference plane does not exceed a fifth predefined distance. In this way, it is possible to avoid, in particular, ground points classified as false positive, thereby increasing a reliability of the method according to the present invention.

Particularly advantageously, the calculation rule effectuates a minimization of the sum of the squared deviations between the cell plane and the corresponding starting ground points and/or cell plane candidate points.

In one further advantageous example embodiment of the present invention, a cell plane is only ascertained for a respective cell or used in a downstream processing step when a value for a distribution of starting ground points or cell plane candidate points within a respective cell reaches a predefined minimum distribution value, the value for the distribution being greater the further the points of a cell which in each case have the largest distance from a center of the cell are situated away from this center, and the more uniformly these points are distributed within the cell. The following computing rule is provided as an efficient option for calculating a respective value for a distribution of starting ground points or cell plane candidate points within a cell:

$$V=(\max(x-y)-\min(x-y))*(\max(x+y)-\min(x+y)),$$

V representing the distribution value, and x and y in each case representing the local or relative coordinates of the points within a considered cell which in each case have the greatest distance from the center. As an alternative or in addition, a cell plane is only ascertained for a respective cell or used in a downstream processing step when the cell plane does not exceed a maximum permissible angle of inclination with respect to the reference plane. This is based on the assumption that a ground surface always only has a certain maximum downhill grade. In a case in which one or multiple of the above conditions is/are not met, it is possible to further use a cell or its content without an assigned cell plane in a downstream processing. As an alternative, it is also possible to ascertain the cell plane for a cell affected in this way in a later iteration step when, in the meantime, for example, additional cell planes from neighboring cells are available which positively influence a result of the ascertainment of the cell plane in the affected cell. As a further alternative, it is possible to use an estimated cell plane, which is formed of one or multiple cell planes of adjoining cells, without further processing as a cell plane for the affected cell.

Advantageously, initially an individual weighting (e.g., with the aid of a degree of confidence) of the cell planes of the adjoining cells takes place during the calculation of the estimated cell plane, the individual weighting being higher the higher a value is for the distribution of starting ground points and/or cell plane candidate points in the respective adjoining cell, and/or the lower a sum is of squared deviations between the cell plane and corresponding starting ground points and/or cell plane candidate points in the respective adjoining cell.

Preferably, all points of the 3D point cloud within a cell including an ascertained cell plane which were not yet classified as ground points or as object points are classified as ground points when their smallest distance from the cell plane of the cell does not exceed the second predefined distance.

In one further advantageous example embodiment of the present invention, a surroundings recognition is carried out in a surroundings recognition system based on the ascertained cell planes (in starting cells and/or candidate cells) and/or based on the ascertained ground points (in starting cells and/or candidate cells) and/or based on the ascertained object points (in starting cells and/or candidate cells).

In one further advantageous embodiment of the present invention, the sensor is a LIDAR sensor (e.g., a point scanner, a line scanner, or a Flash LIDAR) and, in particular, a LIDAR sensor of a means of transportation, the means of transportation preferably being a road vehicle, such as a passenger car, a truck, a bus, a two-wheeler, or a road vehicle differing therefrom.

According to a second aspect of the present invention, a device (e.g., a control unit of a vehicle) for processing a 3D point cloud representing surroundings is provided, the device including an evaluation unit which is configured to carry out a method according to the above description. The evaluation unit is, for example, configured as an ASIC, an FPGA, a processor, a digital signal processor, a microcontroller, or the like, and is preferably connected to an internally and/or externally connected memory unit in terms of information technology, in which data received and/or calculated, for example, while the method according to the present invention is being carried out are filed. With respect to the features, feature combinations as well as the advantages resulting therefrom correspond to those provided in connection with the former aspect of the present invention, reference is made to the above comments to avoid repetition.

BRIEF DESCRIPTION OF THE DRAWINGS

Exemplary embodiments of the present invention are described hereafter in greater detail with reference to the figures.

DETAILED DESCRIPTION OF EXAMPLE EMBODIMENTS

Figure 1:
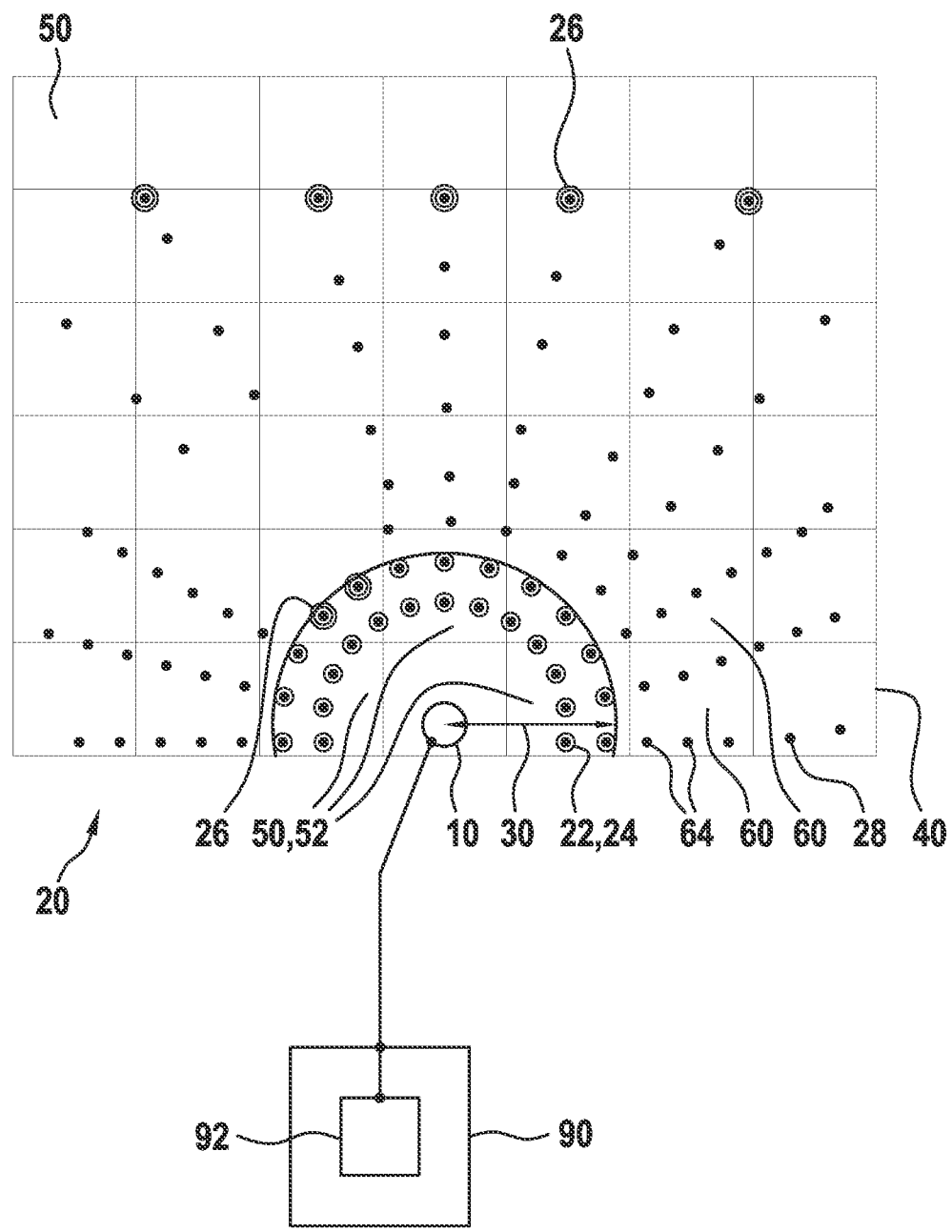
FIG. 1 shows one example of a 3D point cloud processed based on a method according to an example embodiment of the present invention.

FIG. 1 shows one example of a 3D point cloud 20 which is processed based on a method according to the present invention and detected with the aid of a LIDAR sensor 10 of a road vehicle. The points of 3D point cloud 20 are projected onto a reference plane 40 whose orientation essentially corresponds to an orientation of a roadway surface in the immediate surroundings of LIDAR sensor 10. The representation in FIG. 1 corresponds to a top view onto reference plane 40. LIDAR sensor 10 is connected, in terms of information technology, to an evaluation unit 92, in this case a microcontroller, of a control unit 90 of the road vehicle. Evaluation unit 92 is configured to receive the 3D point cloud detected by LIDAR sensor 10 and to process it according to the method according to the present invention. A result of the processing by evaluation unit 92 is transferred, for example, to a surroundings recognition system, which may also be an integral component of control unit 90.

It shall generally be pointed out that, for reasons of a simplified representation, only individual elements are representatively denoted by reference numerals in FIG. 1. These reference numerals implicitly also apply accordingly for identically represented further elements in FIG. 1.

With the aid of evaluation unit 92, 3D point cloud 20 is initially divided into a plurality of square cells 50 abutting one another without interruption. Thereafter, those points of 3D point cloud 20 are considered which are situated within a first predefined distance 30 of 15 m from LIDAR sensor 10. For all points within first distance 30, it is checked in each case whether a shortest distance of these points from reference plane 40 does not exceed a third predefined distance of 0.3 m. In the event that the third distance is not exceeded for a respective point, the respective point is established as a starting ground point 22. All ground points 24 established as starting ground points 22 are marked here by a single ring which surrounds starting ground points 22.

Moreover, points of 3D point cloud 10 are identified with the aid of evaluation unit 92 as obvious object points 26 (i.e., points which were obviously caused by an object in the surroundings) which are situated within first distance 30 and whose smallest distance from reference plane 40 is above a predefined object minimum distance of 0.3 m and whose vector products 72 with directly adjoining points in each case exceed a third predefined angular deviation of 45° with respect to a normal 45 of reference plane 40. These obvious object points 26 are in each case identified by two concentric rings which surround the obvious object points 26.

Thereafter, those cells 50 within first distance 30 which have a required minimum number of corresponding starting ground points 22, the minimum number corresponding to a value of 5 here, are established as starting cells 52.

Thereafter, a cell plane 54 is ascertained for each starting cell 52, cell plane 54 approximating the position of starting ground points 22 in the respective cell 50 in such a way that a sum of the squared deviations of the shortest distances of starting ground points 22 of the cell from cell plane 54 is minimized.

Thereupon, candidate cells 60 abutting starting cells 52 are ascertained, which must each include a minimum number of two points here to be considered candidate cells 60. For each candidate cell 60, an estimated cell plane 62 is now ascertained from the previously ascertained cell planes 54 of adjoining starting cells 52 in that an average plane is ascertained from all directly abutting, adjoining cell planes 54.

In each candidate cell 60, cell plane candidate points 64 are now ascertained whose smallest distance from estimated cell plane 62 does not exceed a second predefined distance 66 of 0.3 m.

Thereafter, a cell plane 54 is ascertained for each candidate cell 60, cell plane 54 approximating the position of cell plane candidate points 64 in the respective candidate cell 60 in such a way that a sum of the squared deviations of the shortest distances of cell plane candidate points 64 of candidate cell 60 from cell plane 54 is minimized.

Proceeding from the previously processed candidate cells 60, candidate cells 60 which abut these candidate cells 60 and which have not yet been processed are identified according to the above description, and above-described method steps are employed to also ascertain cell planes 54 and ground points 24 corresponding thereto for these candidate cells 60. This is continued until all cells 50 of reference plane 40 have been processed.

In the event that the boundary conditions for ascertaining cell planes 54 and ground points 24 for the respective cells 50 (starting cells 52 and candidate cells 60) should not be met, an estimated cell plane 62 is used for these cells 50, which is ascertained from all existing cell planes 54 in adjoining cells 50 (starting cells 52 and candidate cells 60).

Thereafter, those points of 3D point cloud 20 are classified as object points 26 which are situated within the first predefined distance 30 from sensor 10, whose smallest distance from cell plane 54 exceeds a predefined object minimum distance, and whose vector products 72 with directly adjoining points exceed a third predefined angular deviation of 45° with respect to a normal of cell plane 54.

Figure 2:
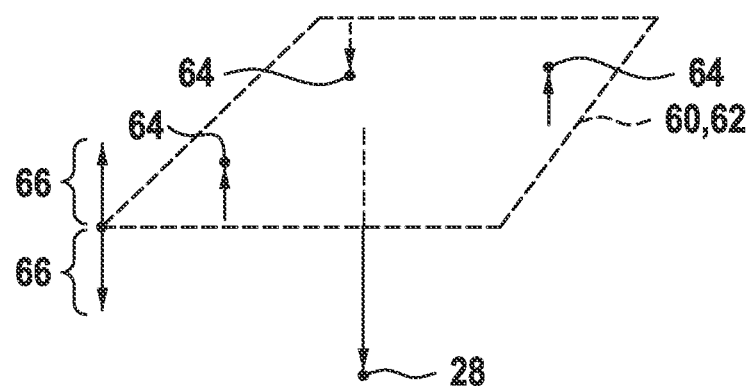
FIG. 2 shows one example of a candidate cell and points of the 3D point cloud corresponding to the candidate cell.

FIG. 2 shows one example of a candidate cell 60 and points of 3D point cloud 20 corresponding to candidate cell 60. Four points of 3D point cloud 20 are shown, which in a projection onto a reference plane 40 (not shown), which represents a ground surface and which is divided into a plurality of mutually abutting cells 50, are situated within cell 50 of reference plane 40 which corresponds to candidate cell 60. An estimated cell plane 62 of candidate cell 60 was ascertained based on cell planes 54 which exist in cells 50 which abut candidate cell 60. Now those points of the 3D point cloud whose distance from estimated cell plane 62 does not exceed a second predefined distance 66 of 0.2 m are identified as cell plane candidate points 64. This applies both to points above and below the estimated cell plane 62. Three of these points meet this distance criterion here, while one of the points does not meet this criterion and accordingly is rated as a non-classified point 28. Based on the points identified as cell plane candidate points 64, thereafter a final, i.e. non-estimated, cell plane 54 is ascertained for this candidate cell 60.

Figure 3:
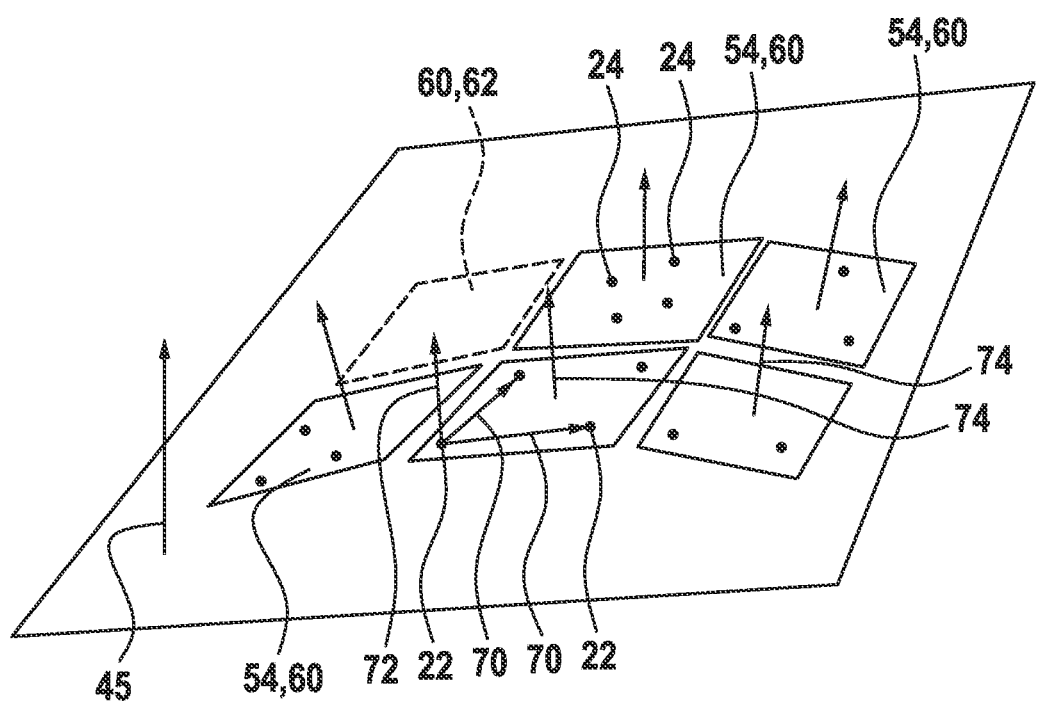
FIG. 3 shows one example of an iterative cell growth according to an example embodiment of the present invention along a ground surface.

FIG. 3 shows one example of an iterative cell growth according to the present invention along a ground surface. FIG. 3 may be considered a detail from FIG. 1, further cells 50 of reference plane 40 already having been processed here compared to FIG. 1. To avoid repetition, only differences compared to FIG. 1 are therefore described hereafter. Shown is a starting cell 50 and four candidate cells 60, for each of which a cell plane 54 was ascertained. For each of these cells 50, 60, a local normal vector 74 was ascertained in each case, which is an average vector which was ascertained based on all vector products 72 which result from possible combinations of vectors 70 between ground points within a cell 50, 60. Local normal vectors 74 are subsequently used to ascertain an angular deviation between the respective local normal vectors 74 and a normal vector 45 of reference plane 40. If the ascertained angular deviation is greater than a predefined second angular deviation of 15°, the respective cell plane, 54, 62 is not taken into consideration in a downstream processing since it is then not regarded as a reliable ground cell. Moreover, an estimated cell plane 62 of a candidate cell 60 to be instantaneously processed is shown in FIG. 3.

What is claimed is:

1. A method for processing a 3D point cloud representing surroundings, comprising the following steps:
receiving the 3D point cloud based on a sensor;
ascertaining starting ground points within the 3D point cloud, points of the 3D point cloud which are situated within a first predefined distance from the sensor and meet at least one predefined ground point criterion with respect to a reference plane being classified as the starting ground points, the reference plane being a plane which is predefined with respect to the sensor and being a plane which represents a ground surface;
dividing at least one sub-area of the reference plane into a plurality of cells, and ascertaining points of the 3D point cloud which correspond to each cell of the plurality of cells, points of the 3D point cloud corresponding to a respective cell of the plurality of cells being those points which are enclosed by the respective cell in a perpendicular projection onto the reference plane;
establishing cells of the plurality of cells which have a first predefined minimum number of the starting ground points as starting cells, the first predefined minimum number of the starting ground points including at least three of the starting ground points;

for each respective starting cell of the starting cells, ascertaining a cell plane, the cell plane being ascertained in such a way that it approximates a position of the starting ground points of the respective starting cell according to a predefined calculation rule;

ascertaining candidate cells within the reference plane, each candidate cell of the candidate cells:
- being a cell for which no cell plane has been ascertained yet,
- abutting at least one further cell for which a cell plane has already been ascertained, and
- including a second predefined minimum number of corresponding points of the 3D point cloud;

calculating an estimated cell plane for each respective candidate cell of the candidate cells from all cell planes which are present in cells which directly abut the respective candidate cell;

ascertaining cell plane candidate points for each respective candidate cell of the candidate cells, each point of the 3D point cloud being ascertained as a cell plane candidate point for the respective candidate cell when:
- the point corresponds to the respective candidate cell, and
- a smallest distance from the point to the estimated cell plane of the respective candidate cell and/or from the point to the reference plane does not exceed a second predefined distance; and for each respective candidate cell of the candidate cells, ascertaining a cell plane, the cell plane being ascertained in such a way that it approximates a position of the cell plane candidate points of the respective candidate cell according to the predefined calculation rule.

2. The method as recited in claim 1, wherein:
(i) the plurality of cells which divide the reference plane abut one another without interruption, and/or are triangular or quadrangular cells, and/or
(ii) a shape and/or an extension of the plurality of cells is adapted as a function of a maximum resolution of the sensor, and/or existing boundary conditions.

3. The method as recited in claim 1, wherein the at least one predefined ground point criterion is met when:
a shortest distance between respective points of the 3D point cloud and the reference plane does not exceed a third predefined distance, and/or
all vector products which result from possible combinations of vectors between a respective point of the 3D point cloud to be considered and at least two points directly adjoining the respective point of the 3D point cloud to be considered have a maximum permissible first angular deviation with respect to a normal of the reference plane, and/or
an average vector, ascertained from vector products which result from possible combinations of vectors between a respective point of the 3D point cloud to be considered and at least two directly adjoining points of the 3D point cloud, has a maximum permissible second angular deviation from the normal of the reference plane.

4. The method as recited in claim 1, wherein points of the 3D point cloud are classified as object points when:
they are situated within the first predefined distance from the sensor,
their smallest distance from the reference plane or from a corresponding estimated cell plane or from a corresponding cell plane exceeds a predefined object minimum distance, and
their vector products with directly adjoining points exceed a third predefined angular deviation with respect to a normal of the reference plane.

5. The method as recited in claim 1, wherein each respective point of the 3D point cloud, regardless of a prior classification as ground point, is classified as an object point when:
their closest adjoining point was classified as an object point,
a shortest distance from their closest adjoining point does not exceed a fourth predefined distance, and
a distance between the respective point and their closest adjoining point with respect to the reference plane does not exceed a fifth predefined distance.

6. The method as recited in claim 1, wherein the predefined calculation rule effectuates a minimization of a sum of squared deviations between a respective cell plane and the corresponding starting ground points and/or cell plane candidate points of the corresponding starting cell and/or candidate cell for the respective cell plane.

7. The method as recited in claim 1, wherein each cell plane of the cell planes ascertained for each starting cell of the starting cells and for each candidate cell of the candidate cells is only ascertained for a respective cell or used in a downstream processing step when:
a value for a distribution of starting ground points or cell plane candidate points within the respective cell reaches a predefined minimum distribution value, the value for the distribution being greater the further the points of the respective cell which have a largest distance from a center of the respective cell are situated away from the center of the respective cell, and the more uniformly the points of the respective cell are distributed within the respective cell, and/or
the cell plane does not exceed a maximum permissible angle of inclination with respect to the reference plane.

8. The method as recited in claim 1, wherein initially an individual weighting of each cell plane of cell planes of adjoining cells takes place during the calculation of the estimated cell plane for each respective candidate cell of the candidate cells, the individual weighting being higher:
the higher a value is for a distribution of starting ground points and/or cell plane candidate points in a respective adjoining cell, and/or
the lower a sum is of squared deviations between a cell plane of a respective adjoining cell and corresponding starting ground points and/or cell plane candidate points in the respective adjoining cell.

9. The method as recited in claim 1, wherein all points of the 3D point cloud within a cell including an ascertained cell plane which were not yet classified as ground points or as object points are classified as ground points when their smallest distance from the ascertained cell plane of the cell does not exceed the second predefined distance.

10. The method as recited in claim 1, wherein a surroundings recognition is carried out in a surroundings recognition system based on ascertained cell planes and/or ascertained ground points and/or ascertained object points.

11. The method as recited in claim 1, wherein the sensor is a LIDAR sensor of a transportation device.

12. A device for processing a 3D point cloud representing surroundings, the device comprising:
an evaluation unit configured to:
receive the 3D point cloud based on a sensor;
ascertain starting ground points within the 3D point cloud, points of the 3D point cloud which are situated within a first predefined distance from the sensor and meet at least one predefined ground point criterion with respect to a reference plane being classified as the starting ground points, the reference plane being a plane which is predefined with respect to the sensor and being a plane which represents a ground surface;

divide at least one sub-area of the reference plane into a plurality of cells, and ascertain points of the 3D point cloud which correspond to each cell of the plurality of cells, points of the 3D point cloud corresponding to a respective cell of the plurality of cells being those points which are enclosed by the respective cell in a perpendicular projection onto the reference plane;

establish cells of the plurality of cells which have a first predefined minimum number of the starting ground points as starting cells, the first predefined minimum number of the starting ground points including at least three of the starting ground points;

for each respective starting cell of the starting cells, ascertain a cell plane, the cell plane being ascertained in such a way that it approximates a position of the starting ground points of the respective starting cell according to a predefined calculation rule;

ascertain candidate cells within the reference plane, each candidate cell of the candidate cells:
- being a cell for which no cell plane has been ascertained yet,
- abutting at least one further cell for which a cell plane has already been ascertained, and
- including a second predefined minimum number of corresponding points of the 3D point cloud;

calculate an estimated cell plane for each respective candidate cell of the candidate cells from all cell planes which are present in cells which directly abut the respective candidate cell;

ascertain cell plane candidate points for each respective candidate cell of the candidate cells, each point of the 3D point cloud being ascertained as a cell plane candidate point for the respective candidate cell when:
- the point corresponds to the respective candidate cell, and
- a smallest distance from the point to the estimated cell plane of the respective candidate cell and/or from the point to the reference plane does not exceed a second predefined distance; and for each respective candidate cell of the candidate cells, ascertain a cell plane, the cell plane being ascertained in such a way that it approximates a position of the cell plane candidate points of the respective candidate cell according to the predefined calculation rule.

* * * * *